March 1, 1927.
B. C. HECKMAN
1,619,512
FISHING APPARATUS
Filed July 15, 1926    4 Sheets-Sheet 4
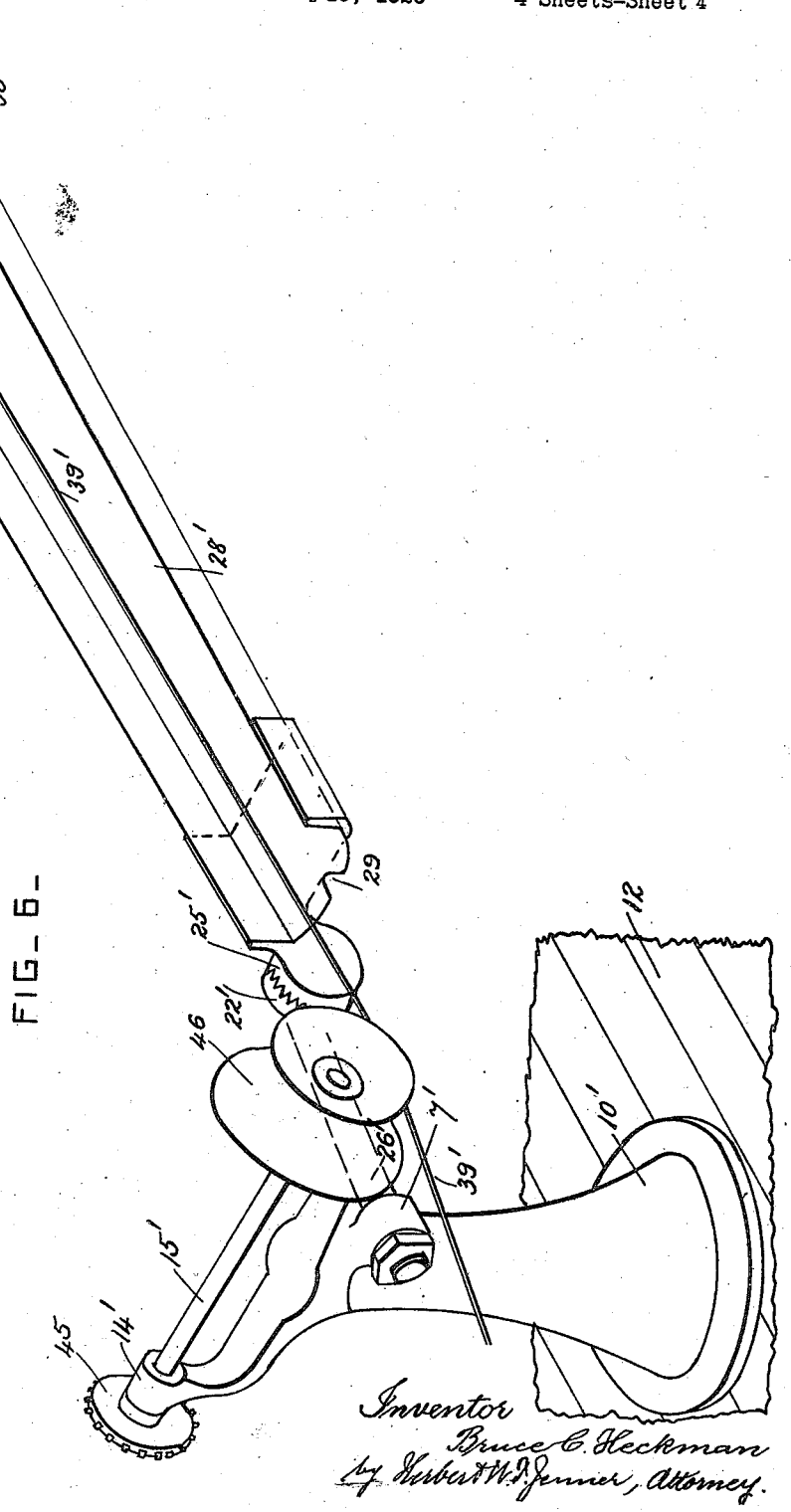

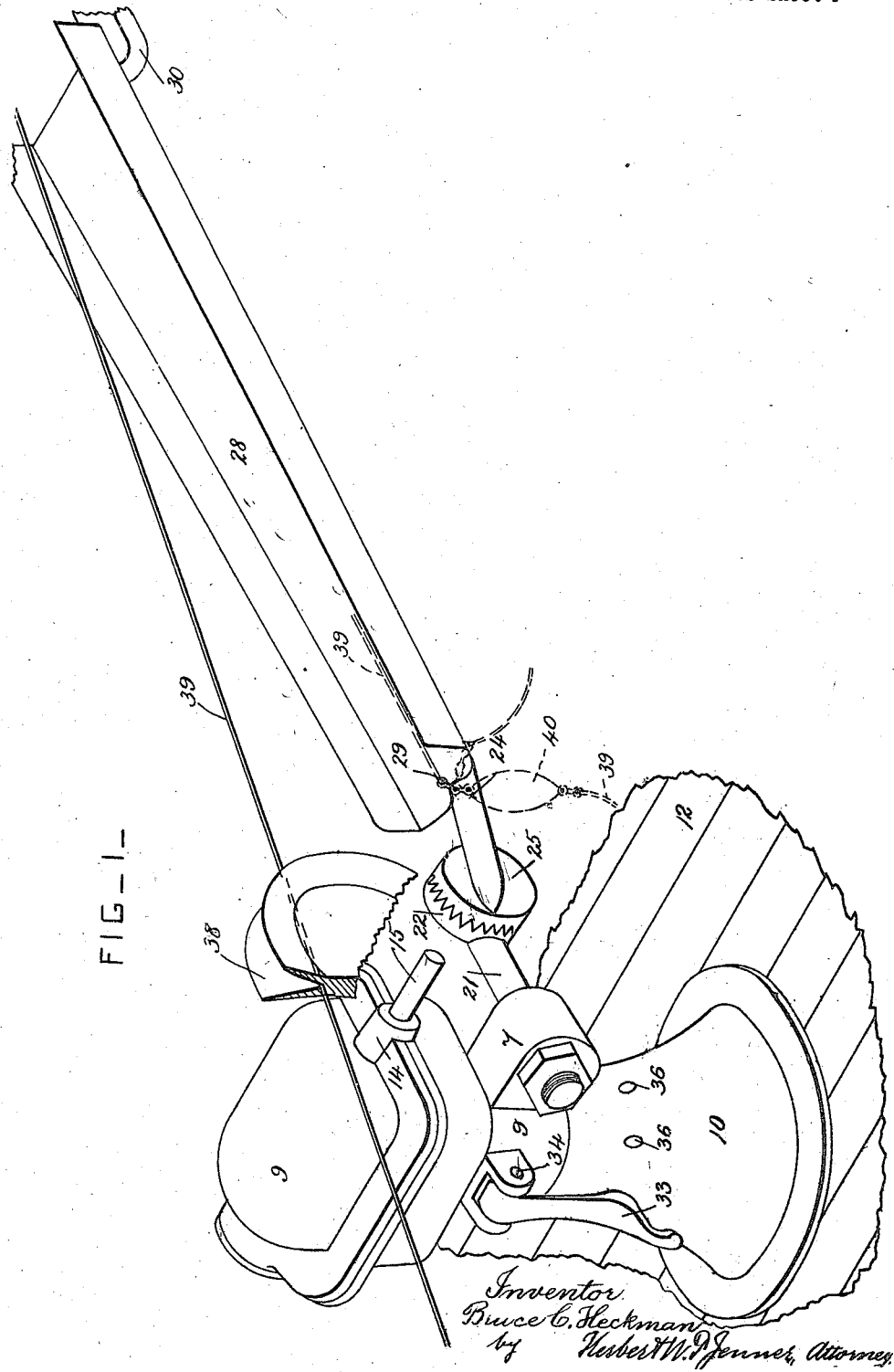

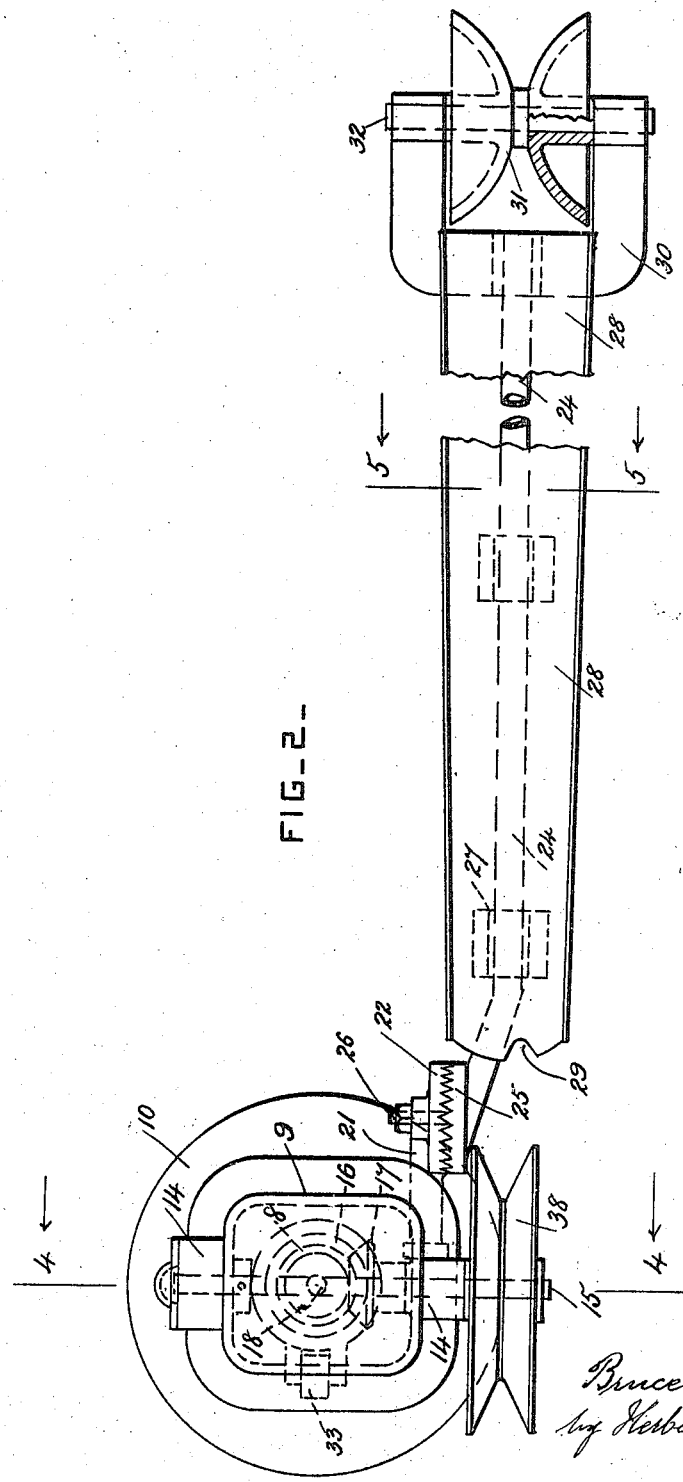

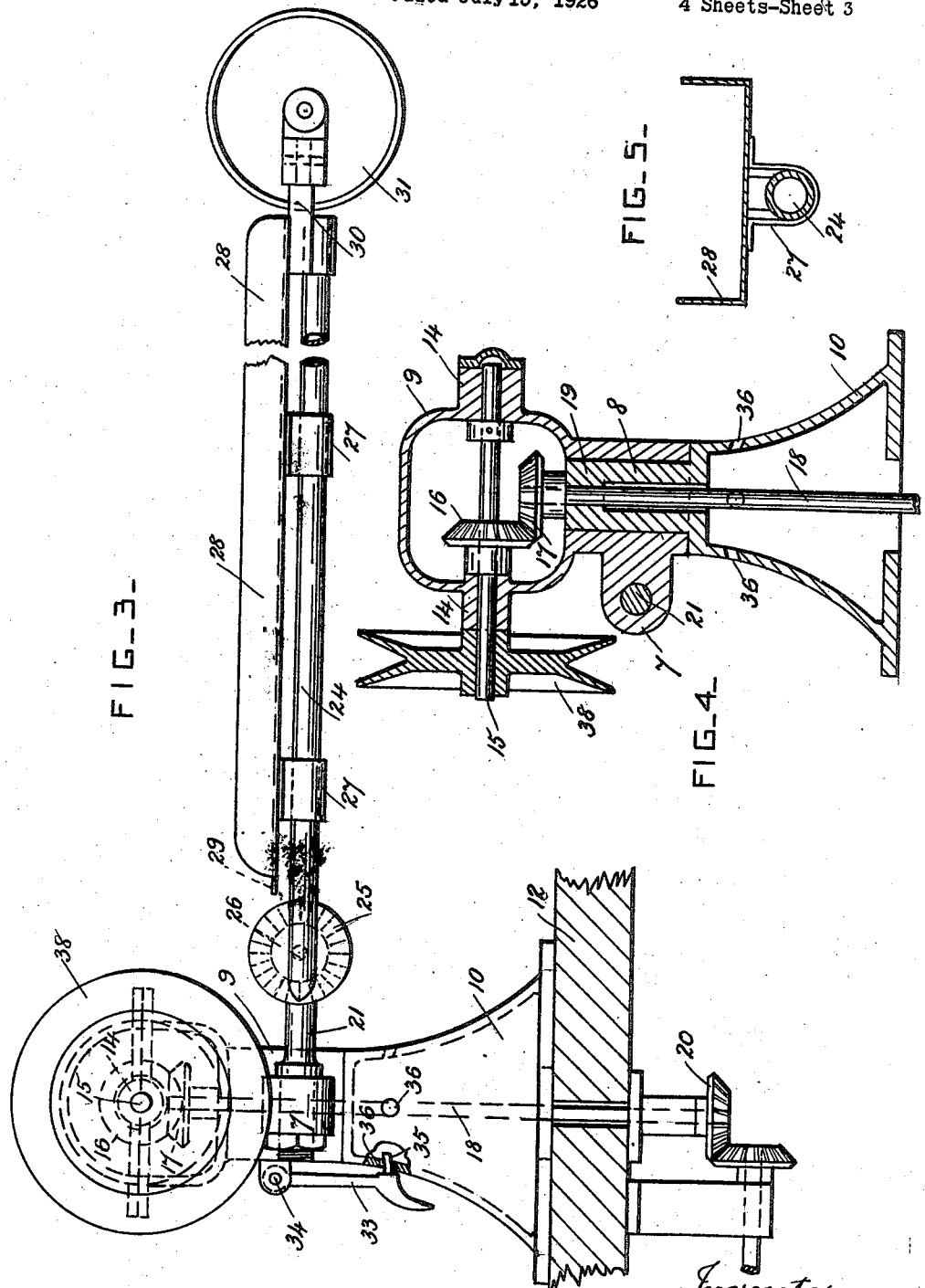

Patented Mar. 1, 1927.

1,619,512

UNITED STATES PATENT OFFICE.

BRUCE C. HECKMAN, OF EUREKA, CALIFORNIA.

FISHING APPARATUS.

Application filed July 15, 1926. Serial No. 122,622.

This invention relates to apparatus used in deep sea fishing for such fish as salmon and halibut. The apparatus is secured on the deck of any approved form of boat, and is operated by power. In fishing for salmon a main fish-line forty or more fathoms long is used, and heavy lead sinks spaced about six fathoms apart are secured on the line. A separate branch line about four fathoms long is attached to the main line by a swivel at certain of the sinkers, and each branch line is provided with a suitable spinner hook and swivel leader. The first or winding end portion of the line is not provided with hooks and branch lines. In fishing for halibut, two hundred, more or less, halibut hooks are used, and are attached to short branch lines three or more feet long, which in turn are attached to a main line, and are spaced about six feet apart. One end of the main line is anchored and its other end is attached to a float, such as a barrel. When desired to haul in the line, the line is detached from the float, and is attached to a winding apparatus on the boat similar to that used for salmon.

In carrying out the present invention the winding mechanism is so constructed that all of the fishing line, including the sinkers, branch lines and the fish, is pulled up onto the boat by power, so that the fish can be removed from the hooks with facility, and so that no hand power is necessary to get them and the sinkers on board after the first portion of the fish-line has been hauled in. The invention consists in the novel construction of the winding apparatus on the boat as hereinafter fully described and claimed.

In the drawings, Figure 1 is a perspective view of a portion of the preferred form of winding apparatus mounted on the deck of a boat and adapted for halibut fishing. Fig. 2 is a plan view of the apparatus shown in Fig. 1. Fig. 3 is a side view of the apparatus. Fig. 4 is a vertical section, taken on the line 4—4 in Fig. 2. Fig. 5 is a cross-section through the trough, taken on the line 5—5 in Fig. 2. Fig. 6 is a perspective view, similar to Fig. 1, but shows a modification in the apparatus, and is more particularly adapted for salmon fishing.

A suitable supporting frame 10 is secured to the deck 12 of the fishing-boat, and is provided with a vertical trunnion 8. A housing 9 is mounted to revolve on the trunnion 8, and is provided with shaft bearings 14. A winding shaft 15 is journaled in the bearings 14, and is arranged horizontally. A bevel gear 16 is secured on the shaft 15, and meshes into a bevel gear 17 secured on a vertical driving shaft 18, which is journaled in a bearing 19 in the trunnion 8, and this shaft projects through a hole in the deck 12. The driving shaft 18 is revolved by a driving wheel 20 by means of any suitable motor arranged below the deck. The housing 9 can be turned around, to adapt the fishing apparatus for use over the side or over the stern of the boat, as occasion may require.

A short arm 21 projects horizontally from the housing 9 at a suitable height above the deck, and is provided with a toothed clutch member 22. This arm 21 is secured in a lug 7 on the housing by any approved means, such as a nut.

The short arm 21 is adjusted in a horizontal plane circumferentially of the axis of the housing, and the housing 9 is then locked to the supporting frame 10, by any suitable locking device. A locking member 33 is shown pivoted to the housing by a pin 34, and having a locking pin 35 which is adapted to engage with any one of a series of holes 36 in the supporting frame.

A vertically adjustable fishing arm 24 is provided, and its main portion is preferably formed of a pipe or tube for lightness and strength. The fishing arm 24 has a toothed clutch member 25 at one end, which is clamped to the clutch member 22 by a horizontal bolt 26. The arm 24 can be moved pivotally on the bolt 26 when the clutch members are disengaged, so that the arm 24 can be adjusted in a vertical plane and clamped at any desired angle. The fishing arm is made of any suitable length so as to project over the side of the boat.

A trough 28, channel-shaped in cross-section, is secured by clips 27 above the tube and forms a part of the fishing arm. This trough is preferably tapered and is broader at its outer or free end portion than at its inner end. The bottom at the narrow or inner end portion of the trough is provided with a notch 29, which is shaped so that the notched part of the bottom will engage with any one of the sinkers on the line 39, and will operate as a retaining device to prevent the line from running out, unless the sinkers are held clear of the notch. This permits any desired length of line to be paid out and held fast.

The fishing arm has a bracket 30 secured to its free end portion, at the outer and broad end of the trough, and a guide sheave or spool 31 is journaled by a pin 32 in this bracket. The guide sheave or spool is of any desired form, and sheaves of various forms are provided, and are used interchangeably according to the kind of fish to be caught. A preferred form of guide sheave consists of two semi-spherical segments with a small cylindrical drum between their convex faces. This permits the line to be drawn in at various angles without jumping out of the sheave. This is necessary as the boat is not stationary, and is sometimes required to make a turn or be run in a curved direction, so that the line is at an angle laterally to the direction of travel of the boat. This form of guide sheave also permits all the sinkers, swivels, hooks and line to pass over it with facility.

A suitable winding sheave 38 is secured on one end portion of the winding shaft 15 in line with the trough 28. The line 39 is wound in by holding it in frictional engagement with the groove of the winding sheave, and the line may be drawn in at various speeds by holding it tight or slack in the groove. The line and the sinkers slide down the trough when drawn over the guide sheave, and the main line is coiled upon the deck, in any convenient way and position. The part of the line not wound in is held from slipping by placing one of the sinkers 40 in engagement with the notch 29 in the inner end of the trough, as shown by dotted lines in Fig. 1.

By the use of this apparatus the labor of pulling in the line by hand is done away with. The line is pulled in more quickly, and better opportunity is afforded to properly dispose of the fish.

The fishing apparatus shown in Fig. 6 is better adapted for pulling in the lighter line 39′ used for salmon and other similar fish. The frame 10′ is secured to the deck, and the bearings 14′ and lug 7′ are formed on the frame instead of being formed on a housing which can be rotated. The winding shaft 15′ is driven by a sprocket wheel 45 secured on it. A suitable motor is provided below the deck, and drives the sprocket wheel by a drive chain, but the winding shaft can be driven by any other approved means.

A warping barrel 46 is secured on the winding shaft, instead of the grooved winding sheave 38, and the line is passed around this barrel and is then coiled up on the deck. The trough 28′ may constitute the main part of the fishing arm 24′, and the tubular part of the arm may be omitted. The trough 28′ then has a toothed clutch member 25′ secured to it and engaging with a clutch member 22′ on a short arm 26′ secured in the lug 7′ which projects from the frame 10′. A guide sheave 31 is journaled in the bracket 30′, which is secured to the outer end of the fishing arm or trough. The line is drawn in at any desired speed by holding it more or less tightly in engagement with the warping drum.

The apparatus shown in Figs. 1 to 5 can also be used for salmon fishing if desired, and a warping barrel may be substituted for the grooved winding sheave if desired. The lines used in salmon fishing may also be supported by outriggers connected to the mast of the boat, and may be wound in by the apparatus hereinbefore described.

When a fish is drawn up to the side of the boat, the line is held by dropping a sinker under the notch in the bottom of the trough, and the fish is hauled over the rail of the boat with a gaff, and is knocked on the head.

What I claim is:

1. In a fishing apparatus, a supporting frame, a fishing arm connected with the frame at one end and having a receiving trough for the line, said trough being open at each end to permit the fish-line to be stretched through it under tension, a guide sheave for the fish-line at the other end of the fishing arm, and a winding device for the fish-line supported by the said frame and arranged in line with the said trough and guide sheave.

2. A fishing apparatus as set forth in claim 1, and having also a retaining device for engaging the fish-line and preventing it from running out arranged at the inner end portion of the fishing arm.

3. A fishing apparatus as set forth in claim 1, and having at the inner end of the bottom of the said trough a notch for engaging the sinkers to prevent the fish-line from running out.

4. In a fishing apparatus, a supporting frame, a fishing arm supported pivotally by the frame and adjustable in a vertical plane, and a clamping device for holding the fishing arm rigidly in any desired position when adjusted.

5. In a fishing apparatus, a supporting frame, an arm supported by the frame and provided with a toothed clutch member, a fishing arm provided with a similar clutch member, and a clamping bolt pivotally connecting the said clutch members, the said fishing arm being adjustable in a vertical plane.

6. In a fishing apparatus, a supporting frame, a fishing arm carried by the frame and having a receiving trough for the fish-line extending longitudinally of it, said trough being tapered and broader at its outer end than at its inner end which is adjacent to the frame.

7. In a fishing apparatus, a supporting frame, an adjustable housing rotatable on the upper part of the frame on a vertical axis and provided with shaft bearings at its upper part, a fishing arm connected at its inner end to the housing below said bearings and having a guide sheave for the fish-line, and a winding shaft for the fish-line journaled in said bearings and provided with a winding sheave on one end portion.

8. In a fishing apparatus, a supporting frame provided at its upper part with a vertical trunnion, an adjustable housing rotatable on the trunnion and provided with shaft bearings at its upper part, a fishing arm connected at its inner end to the housing below said bearings and having a guide sheave for the fish-line, a winding shaft for the fish-line journaled in said bearings and provided with a winding sheave on one end portion, a vertical driving shaft journaled in the trunnion, and driving mechanism inclosed in the housing and connecting the driving shaft with the winding shaft.

9. A fishing apparatus as set forth in claim 7, and provided also with means for holding the housing stationary on the frame after its position has been adjusted.

10. A fishing apparatus as set forth in claim 7, and having also a locking member for the housing, pivoted to the said housing and adapted to engage positively with the said frame.

11. In a fishing apparatus, a supporting frame, a fishing arm having its inner end operatively connected with the said frame and provided with a guide sheave for the fish-line at its outer end, the said fishing arm being adjustable circumferentially of the frame in a horizontal plane and being also adjustable pivotally in a vertical plane.

12. In a fishing apparatus, a supporting frame, an adjustable housing mounted to revolve on the frame on a vertical axis, an adjustable fishing arm carried by the said housing and adjustable in a vertical plane and provided with a guide sheave for the fish-line at its outer end, said fishing arm being adjustable with the housing circumferentially of the frame in a horizontal plane, and a winding device for the fish-line mounted on the said housing.

13. In a fishing apparatus, a supporting frame, a fishing arm connected at one end with the frame and provided with a guide sheave for the fish-line at its other end, said fishing arm comprising a tube and a receiving trough for the line secured to the tube, said trough being open at each end to permit the fish-line to be stretched through it under tension.

14. In a fishing apparatus, a supporting frame, a fishing arm connected at its inner end with the frame and provided with a guide sheave for the fish-line at its outer end, a receiving trough for the fish-line secured to the fishing arm and extending longitudinally of it for the major portion of its length, said trough being open at each end to permit the fish-line to be stretched through it under tension and being wider at its outer end than at its inner end.

15. In a fishing apparatus, a supporting frame, a fishing arm connected at one end with the frame, a guide sheave for the fish-line journaled at the other end of the fishing arm and comprising two semi-spherical segments having a cylindrical drum arranged between their convex faces, said fishing arm having a receiving trough for the fish-line extending longitudinally of it with its outer end arranged adjacent to the said guide sheave and extending laterally across its convex faces, and a winding device for the fish-line supported by the said frame.

16. In a fishing apparatus, a supporting frame, a fishing arm having its inner end operatively connected with the said frame and provided with a guide sheave for the fish-line at its outer end, said fishing arm being adjustable in a horizontal plane and also in a vertical plane and being provided with a longitudinal trough for receiving the sinkers and line, and having also a retaining device for engaging the sinkers and preventing the line from running out, and a winding device for the fish-line supported by the said frame.

In testimony whereof I have affixed my signature.

BRUCE C. HECKMAN.